Jan. 11, 1949.  N. E. LINDSTRÖM  2,458,610
GAS DETECTOR
Filed July 28, 1944
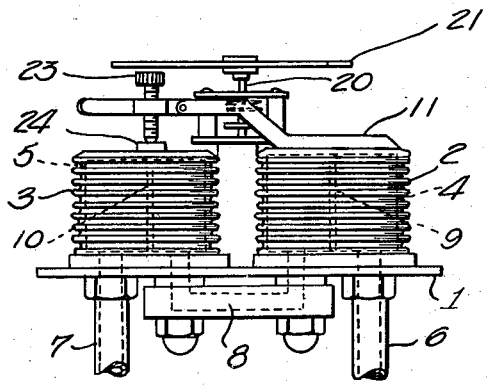
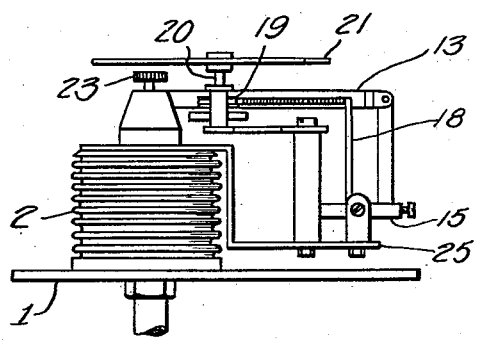
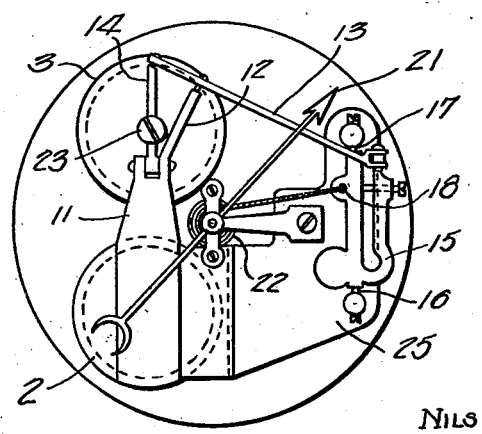
Inventor
NILS ERIK LINDSTRÖM
By Young, Emery & Thompson
Attorneys Patented Jan. 11, 1949

2,458,610

UNITED STATES PATENT OFFICE 2,458,610

GAS DETECTOR

Nils Erik Lindström, Stockholm, Sweden

Application July 28, 1944, Serial No. 547,089
In Sweden June 18, 1943

5 Claims. (Cl. 23—254)

This invention relates to an apparatus for determining the presence of carbon monoxide and other combustible gases or vapors in the atmosphere being tested. One object of my invention is to provide an apparatus of this kind which is a very sensitive gas detector but which nevertheless is reliable in operation and insensitive to shocks and vibrations so that it may be used with advantage on motor vehicles and airplanes. Other objects and advantages will be more fully described hereinafter.

In its broadest aspect the gas detector according to the present invention comprises an expansible vessel containing a volatile medium and a reaction chamber containing a material capable of reacting catalytically with the gas to be detected with simultaneous liberation of heat, the expansible vessel being arranged so as to be heated and expanded by the heat developed due to said reaction and the movement of said vessel being adapted to be transmitted to a pointer or other indicating or alarm device.

A preferred embodiment of my invention is illustrated in the accompanying drawings, wherein:

Figs. 1 and 2 are elevations of the apparatus at right angles to each other; while Fig. 3 is a plan view.

In the drawings 1 designates a base plate upon which two closed corrugated metallic cylinders, or bellows, 2 and 3 are mounted. Each cylindrical bellows surrounds a chamber 4 and 5, respectively. The chamber 4 has an inlet 6 for the air or the like to be tested, and the chamber 5 has an outlet 7. The chambers 4 and 5 are interconnected by means of a U-shaped conduit 8. Each chamber contains a partition 9 and 10, respectively, these partitions being arranged so that the air is compelled to flow along an extended path from the inlet to the outlet. A holder 11 is attached to the top of the corrugated cylinder 2, this holder being shaped as a fork (Fig. 3) with one leg 12 of greater length than the other and bent aside. At the end of the leg 12 a two-armed lever 13 is rotatably mounted, one arm of which is linked to one end of an arm 14 whose other end is pivotally connected to the fork 11, whereas the other arm of the lever 13 is connected by means of a link to a bridge member 15 pivoting on two points 16 and 17 carried by a bracket 25 which is attached to the bellows 2. The bridge member 15 is connected by means of an arm 18 and a wire, or a chain, with a pulley 19 mounted on a shaft 20 which carries a pointer 21, the shaft being also actuated by a restoring spring 22. The details 15 to 22 are previously known from aneroid barometer constructions and therefore need not be described more closely. The arm 14 is provided with a threaded hole for a screw 23 which is adjustable and adapted to coact with a stud 24 mounted on the top of the cylindrical bellows 3.

The space between the chambers 4 and 5, respectively, and the corresponding cylindrical bellows is substantially filled with a liquid of low boiling point, such as for instance ethyl chloride, ethyl amine or ethyl ether. The chamber 5 is filled with a reaction mass which when the gas to be detected is carbon monoxide may be constituted by a material known on the market under the trade-mark name "Hopcalite" and consisting of a granular mixture of manganese dioxide, copper oxide, silver oxide and cobalt sesquioxide, this mixture being capable of catalytically oxidizing carbon monoxide to carbon dioxide at normal temperatures with liberation of heat in an amount which is proportional to the carbon monoxide content. The chamber 4 may be filled with copper borings, porcelain pieces or the like inert material.

The operation of the apparatus is as follows. When a carbon monoxide containing gas, for instance air, which has been deprived of its moisture is blown or drawn through the chambers 4 and 5 by means of a pump the carbon monoxide is catalytically oxidized in the chamber 5 with simultaneous liberation of heat. This causes the liquid in the surrounding expansible vessel 3 to be heated so that the pressure therein is increased and the vessel 3 alters its length. The stroke of the vessel 3 is transmitted to the arm 14 by means of the stud 24 and the screw 23 and as a result thereof the lever 13 is rotated causing a deflection of the pointer 21. A dial (not shown) with which the pointer coacts may be calibrated so as to show the carbon monoxide content directly in per cent or fractions hereof.

Atmospheric temperature variations will not cause the pointer to be deflected since the details 11 to 14 constitute a differential device which will transmit only a relative movement of one cylindrical bellows with respect to the other, whereas simultaneous and identical movements of the two cylinders 2 and 3 are without influence upon the pointer. In the same manner compensation is obtained also for variations in the barometric pressure.

The details may of course be varied in many ways without departing from the spirit of the invention.

When it is desired to detect carbon monoxide using "Hopcalite" as a catalyst the air must be carefully dried before being introduced into the reaction chamber 5. This drying may be effected by first passing the air through concentrated sulphuric acid or over a layer of silica-gel or other highly moisture-absorbing material. Then the air is passed over a layer of pumice, lead acetate and glycerine and finally it is passed over potassium hydroxide. Drying devices of this kind are known per se and do not form any part of the present invention.

What I claim is:

1. In a gas detecting and measuring apparatus, a reaction chamber provided with a gas inlet and a gas outlet said chamber being adapted to contain a substance capable of bringing about an exothermical reaction of the gas to be detected, a hermetically sealed vessel enclosing said reaction chamber, and provided with expansible outer walls, the unoccupied space within said vessel being filled with an expansible medium, an indicating means, and a mechanical motion transmitting means between said expansion vessel and said indicating means for transmitting motion of the vessel to the indicating means.

2. In a gas detecting and measuring apparatus a reaction chamber provided with a gas inlet and a gas outlet said chamber being adapted to contain a substance capable of bringing about an exothermical reaction of the gas to be detected, a hermetically sealed vessel enclosing said reaction chamber, and provided with expansible outer walls, the unoccupied space within said vessel being filled with an expansible medium, an indicating means, a mechanical motion transmitting means between said expansion vessel and said indicating means for transmitting motion of the vessel to the indicating means, and means whereby only such motion is transmitted which is caused by heat developed at the exothermical reaction.

3. A gas detecting and measuring apparatus according to claim 2, wherein said last-mentioned means comprises a reference expansion vessel similar to that expanded by the heat developed in the reaction chamber and adapted to be maintained at the initial temperature of the gas to be detected, and a lever rotatably supported by one of said vessels and adapted to be rocked only upon a difference in motion between both vessels.

4. In a gas detecting and measuring apparatus, a reaction chamber provided with a gas inlet and a gas outlet said chamber being adapted to contain a substance capable of bringing about an exothermical reaction of the gas to be detected, a second chamber connected in series with the reaction chamber and adapted to contain an inert substance, a hermetically sealed bellows enclosing said reaction chamber, and provided with expansible outer walls, the unoccupied space within said vessel being filled with an expansible medium, a second sealed bellows enclosing the second chamber and provided with expansible outer walls containing the inert substance, the space therebetween being adapted to contain an expansible medium whereby each of the bellows will be expanded in accordance with the heat delivered by its corresponding chamber, means for establishing relative motion on one of said vessels with respect to the other, an indicating means, and mechanical means for transmitting such relative motion to said indicating means.

5. In a gas detecting and measuring apparatus, a hermetically sealed vessel provided with expansible outer walls, a heat transmission chamber arranged within said hermetically sealed vessel and provided with gas inlet and gas outlet channels forming a continuous gas conduit with said heat transmission chamber, the unoccupied space between said vessel and said heat transmission chamber being filled with an expansible medium, said chamber being adapted to contain a substance capable of bringing about an exothermical reaction of the gas to be detected, an indicating means, and a mechanical motion transmitting means between said vessel and said indicating means for transmitting motion of the vessel to the indicating means.

NILS ERIK LINDSTRÖM.

REFERENCES CITED

The following references are of record in the file of this patent:

UNITED STATES PATENTS

| Number | Name | Date |
|---|---|---|
| 970,923 | Hinman | Sept. 20, 1910 |
| 1,007,178 | Billings | Oct. 31, 1911 |
| 1,223,953 | Frisak | Apr. 24, 1917 |
| 1,415,710 | Richter | May 9, 1922 |
| 2,340,008 | Matuszak | Jan. 25, 1944 |

FOREIGN PATENTS

| Number | Country | Date |
|---|---|---|
| 160,930 | Great Britain | Mar. 30, 1921 |
| 171,739 | Great Britain | Nov. 21, 1921 |
| 491,154 | Great Britain | Aug. 26, 1938 |